United States Patent
Ptak et al.

[11] Patent Number: 5,967,602
[45] Date of Patent: Oct. 19, 1999

[54] EXTENDING CARGO SHELF FOR VEHICLE SEAT

[75] Inventors: Kenneth R. Ptak, Livonia, Mich.; Belinda K. Wise, Köln, Germany

[73] Assignee: Hoover Universal, Inc., Plymouth, Mich.

[21] Appl. No.: 09/004,263

[22] Filed: Jan. 8, 1998

[51] Int. Cl.[6] ..................................................... B60N 3/00
[52] U.S. Cl. .................. 297/188.11; 224/275; 296/37.15
[58] Field of Search ............................. 297/144, 188.08, 297/188.11, 423.2, 423.21, 423.22; 224/275; 296/37.15

[56] References Cited

U.S. PATENT DOCUMENTS

| | | | |
|---|---|---|---|
| 2,481,970 | 9/1949 | Bell | 297/423.2 X |
| 2,555,144 | 5/1951 | Louderman et al. | 297/423.22 X |
| 3,026,141 | 3/1962 | Welles | 297/188.11 |
| 3,123,397 | 3/1964 | Murcott | 297/423.2 X |
| 3,239,271 | 3/1966 | Bergersen | 297/423.2 X |
| 3,309,135 | 3/1967 | Jannetto | 224/275 |
| 3,547,326 | 12/1970 | Trammell, Jr. | 224/275 |

FOREIGN PATENT DOCUMENTS

| | | | |
|---|---|---|---|
| 363197 | 11/1992 | Germany | 297/144 |
| 425416 | 2/1993 | Germany | 297/284.11 |

*Primary Examiner*—Peter R. Brown
*Attorney, Agent, or Firm*—Harness, DIckey & Pierce, P.L.C.

[57] ABSTRACT

An extending cargo shelf for a vehicle seat to enable cargo to be carried in the vehicle without placing it on either the vehicle seat or the vehicle floor. The cargo shelf has a stowed position beneath the cushion of the seat bottom and is extended from the seat bottom to enable articles to be placed upon the shelf and supported above the vehicle floor.

12 Claims, 4 Drawing Sheets

EXTENDING CARGO SHELF FOR VEHICLE SEAT

BACKGROUND AND SUMMARY OF THE INVENTION

The present invention relates to vehicle seating and in particular to a cargo shelf which extends from a vehicle seat for carrying and retaining cargo which is not desirable to place on either the vehicle seat or on the vehicle floor.

Most vehicle drivers do not like to carry items such as milk jugs, ice bags, potted plants, etc. on a vehicle seat because they can spill or leak and damage the seat cover. In addition, it is not desirable to carry these items unrestrained on a vehicle floor. A potted plant may tip over and spill dirt. A milk jug can leak if not tightly sealed and the condensation on the jug may pickup dirt and debris from the vehicle floor. Generally, there is no adequate place to carry and retain such cargo within the vehicle interior. Accordingly, it is an object of the present invention to provide an extendible cargo shelf on a vehicle seat that can be used to support such objects above the vehicle floor where they will not collect dirt. In addition, the cargo is restrained so that it cannot move about the vehicle interior or tip over. The cargo shelf also avoids the need to place the objects on the seat upholstery.

The cargo shelf is stored beneath the seat cushion and is extendible from the cushion, typically forward, for placement of cargo thereon. Preferably, the support shelf has an upright wall at the distal, or extended, end to assist in retaining cargo upright on the shelf. To enable wider objects such as a briefcase to be carried on the shelf, the shelf preferably has no sidewalls. This enables the briefcase to be placed on the shelf between the upright end wall and the seat cushion and extend laterally beyond the side edges of the shelf.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
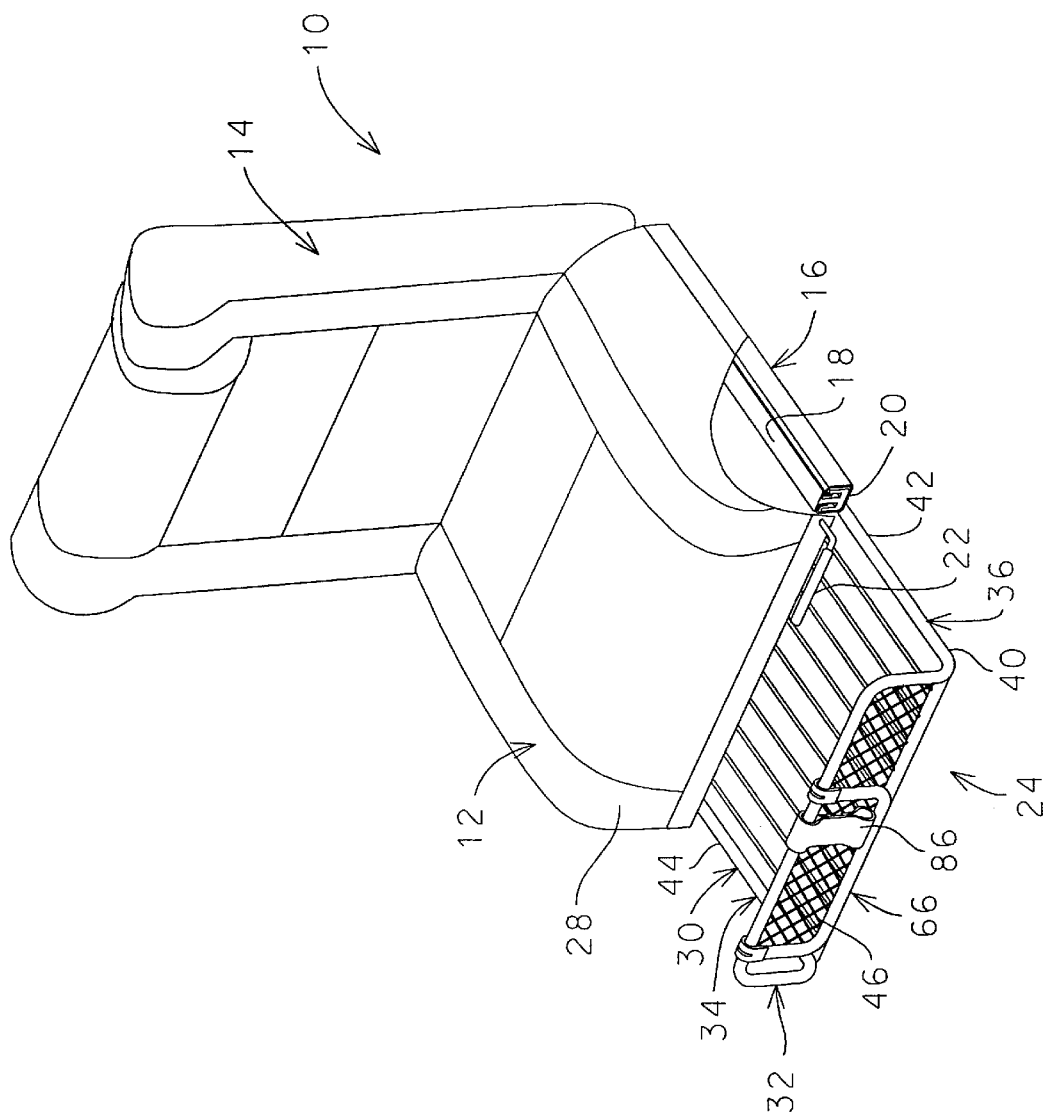
FIG. 1 is a perspective view of a vehicle seat assembly having the cargo shelf of the present invention.

With reference to FIG. 1, a seat assembly 10 is shown having the cargo shelf of the present invention. Seat assembly 10 includes a lower, generally horizontal seat bottom 12 and a generally upright seat back 14 extending upwardly from a rear end of the seat bottom 12. The seat bottom and seat back are mounted to a seat frame 16. Seat frame 16 includes a pair of fore and aft extending slide rails 18, one along each side of the seat assembly. The slide rails 18 are mounted for fore and aft sliding movement along fixed rails 20 that are configured to be attached to the floor of a vehicle body. A handle 22 is provided adjacent the front of the seat bottom for actuating a seat adjuster latch mechanism that holds the slide rails in position relative to the fixed rails to lock the seat assembly in place within the vehicle body. The frame 16 may also include a riser or other structure between the slide rails 18 and the seat bottom 12. Such rail and seat frame structures are well known in vehicle seating. The particular rail and frame structure does not impact the present invention.

In accordance with the present invention, the seat assembly 10 is equipped with an extendible cargo shelf 24 shown in FIG. 1 in its use position extended from the front 26 of the seat bottom. The shelf 24 has a stowed position between the two slide rails 18 and beneath the foam cushion 28 of the seat bottom. The shelf is extendible forward to the use position shown in FIG. 1 to support cargo forward of the seat bottom. The shelf includes a generally horizontal load platform 30 and an end wall 32 extending upwardly generally at a right angle to the platform 30 at the distal, or extended end of the shelf. The end wall enables cargo to be retained in an upright position.

A plastic milk jug can be placed on the shelf to support the milk jug above the floor of the vehicle body. This prevents the jug from rolling around on the vehicle floor forward of the seat where the condensation on the milk jug will collect dirt and debris from the floor which is later carried into the user's home. Furthermore, the end wall enables the milk jug to be retained upright to avoid the possibility of spillage. Other objects such as a potted plant, a bag of ice, etc., that need to be maintained in an upright position can also be placed on the shelf and held upright.

There are no upright side walls along the shelf sides 34 and 36. This enables a wider object, such as a briefcase, to be placed on the shelf and rest firmly on the load platform. The upright end wall 32 holds the briefcase in place between the end wall and the seat cushion. By retaining a briefcase in such a manner, the briefcase will no longer slide off the seat during hard braking, or tip back and forth between the seat front and instrument panel if placed upright on the vehicle floor. In addition, there is no concern of the briefcase being soiled by dirt on the vehicle floor.

The cargo shelf of the present invention is preferably made of a generally U-shaped rod 40 having a pair of legs 42 and 44 which are spaced apart from one another and generally parallel to one another. The U-shape is formed by a cross bar 46 at one end of the legs 42 and 44. Near the cross bar 46, the legs 42 and 44 bend upward at approximately a right angle at 50 to the load platform to form the end wall 32. The end wall is thus formed with a pair of upright members 52 and 54 and the cross member 46 extending across the shelf between the two upright members 52, 54.

A grid 56 is carried by the legs 42 and 44. The grid consists of a pair of cross members 58 and 60 at the distal and proximal ends of the cargo shelf, respectively, and a plurality of laterally spaced grid wires 62 extending fore and aft between the grid cross members 58 and 60. Other grid structures may be used as well.

In a preferred construction, the cargo shelf is made of metal which is painted or plated. The shelf could be molded of plastic or assembled from components made of different materials.

The end wall 32 includes an extension 66 to selectively increase the height of the end wall above the cross bar 46. The extension 66 is formed by a second U-shaped rod 68 having a pair of legs 70 and cross piece 72. In its stowed position, the extension hangs down from the cross bar 46 between the cross bar 46 and the load platform 30 of the cargo shelf. The extension 66 is rotatably mounted to the cross bar 46 and can be rotated to an upward extending use position, shown in phantom line, extending upward above the cross bar 46. This enables taller objects such as a briefcase, to be firmly retained on the cargo shelf.

In one embodiment of the invention, tension springs 74 are attached to the proximal end of the cargo shelf and to the seat frame 16 to bias the cargo shelf to its stowed position beneath the cushion 28. The continuous biasing of the shelf to its stowed position enables the end wall 32 to firmly retain any cargo between the end wall and the front edge of the seat bottom.

Figure 3:
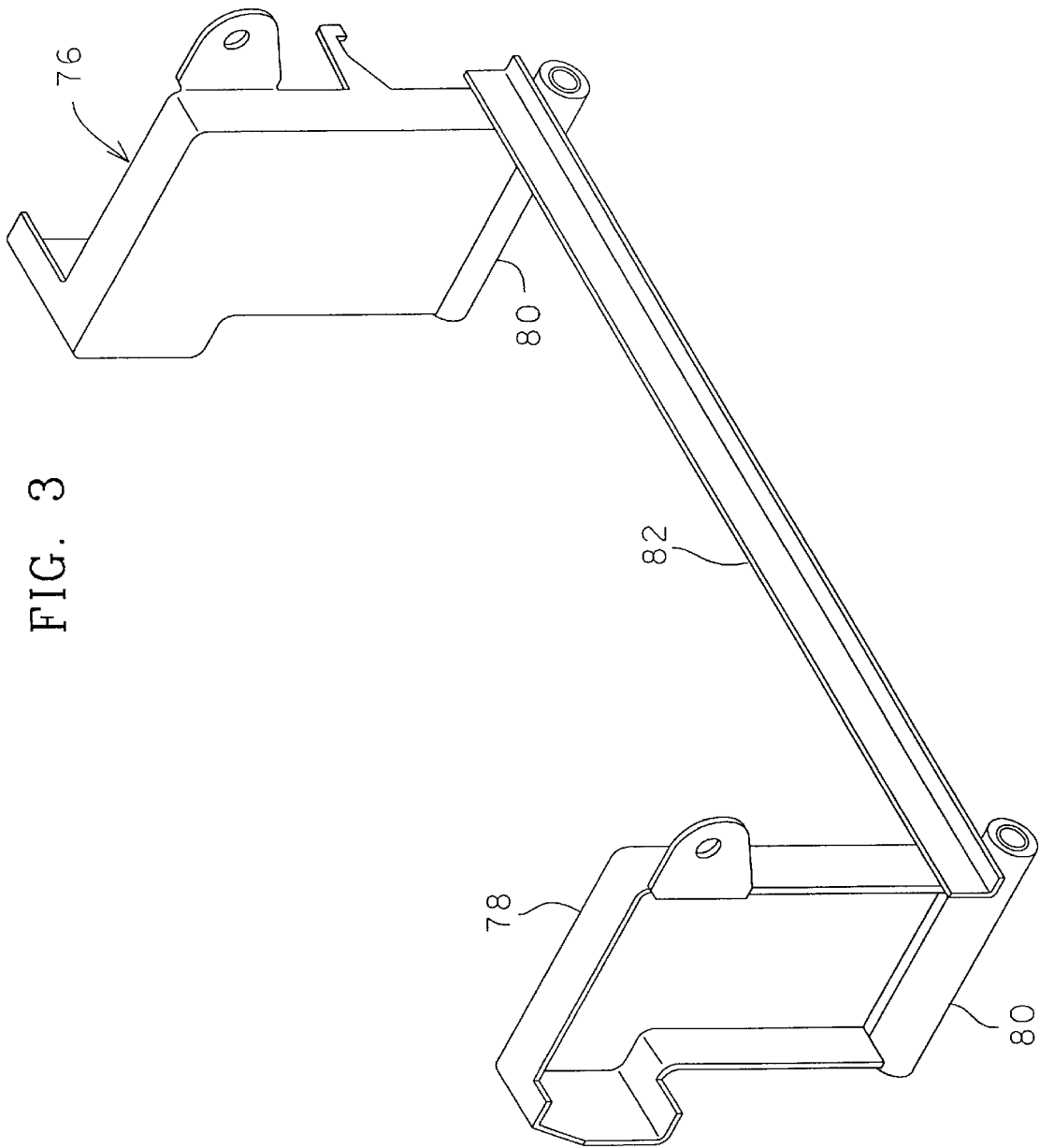
FIG. 3 is a perspective view of the mounting brackets 4 attaching the cargo shelf to the seat frame.
Figure 4:
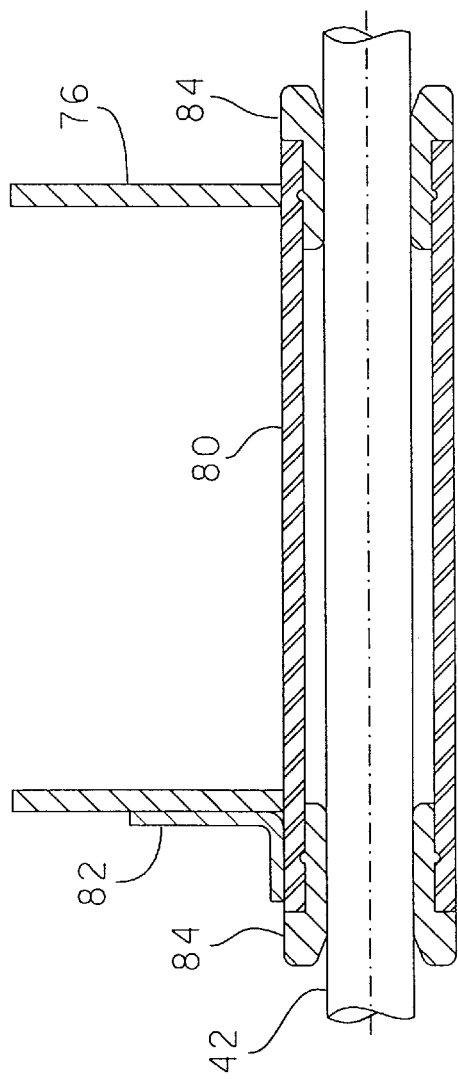
FIG. 4 is a sectional view through the mounting tube at the lower end of a bracket for attaching the shelf to the seat frame.

With reference to FIGS. 3 and 4, left and right brackets 76 and 78 respectively are shown which are used to attach the cargo shelf to the seat frame. The brackets 76 and 78 are welded, bolted, riveted or otherwise attached to the frame 16. The brackets may be welded to one another by a cross bar 82 as shown. At their lower ends, each of the brackets include a cylindrical tube 80. The tube 80 is a cylindrical tube welded or otherwise attached at the lower end of the brackets 76, 78. A pair of nylon bushings 84 are placed at each end of the tubes 80. The shelf legs 42, 44 slide within the bushings 84.

To assemble the shelf and frame, the legs 42 and 44 are inserted into the tubes 80 of the brackets 76, 78 prior to the attachment of the grid cross member 60 to the shelf legs at the proximal end of the shelf. Once the cross member 60 is attached to the legs, the legs cannot be removed from the tubes 80. Alternatively, the tubes 80 could be formed as two clam shell pieces at the lower end of the bracket 76 that are bolted or assembled around the shelf legs 42 and 44. This would enable the shelf to be attached to the brackets after the brackets have been mounted to the seat frame. In another embodiment, a single stamped clamp bracket with a cylindrical recess can be attached to the brackets 76, 78 to secure a bushing, which has previously been placed on the shelf legs to the bracket 76, 78. In another alternative embodiment, the shelf legs could extend well beyond the grid cross member 60 forming a mounting portion which slides through the tubes 80. These extending legs can be inserted into the tubes after final assembly of the shelf.

The shelf 24 slides through the bushings between the stowed position, beneath the foam cushion 28 of the seat bottom, and an extended use position. The springs 74 bias the shelf to its stowed position. To pull the shelf from its stowed position, a pull strap 86 is provided on the end wall 32 and shown wrapped around the cross bar 46. The pull strap 86 enables the user to readily distinguish between the shelf and the seat adjuster release lever which may be located nearby at the lower front edge of the seat bottom.

Figure 2:
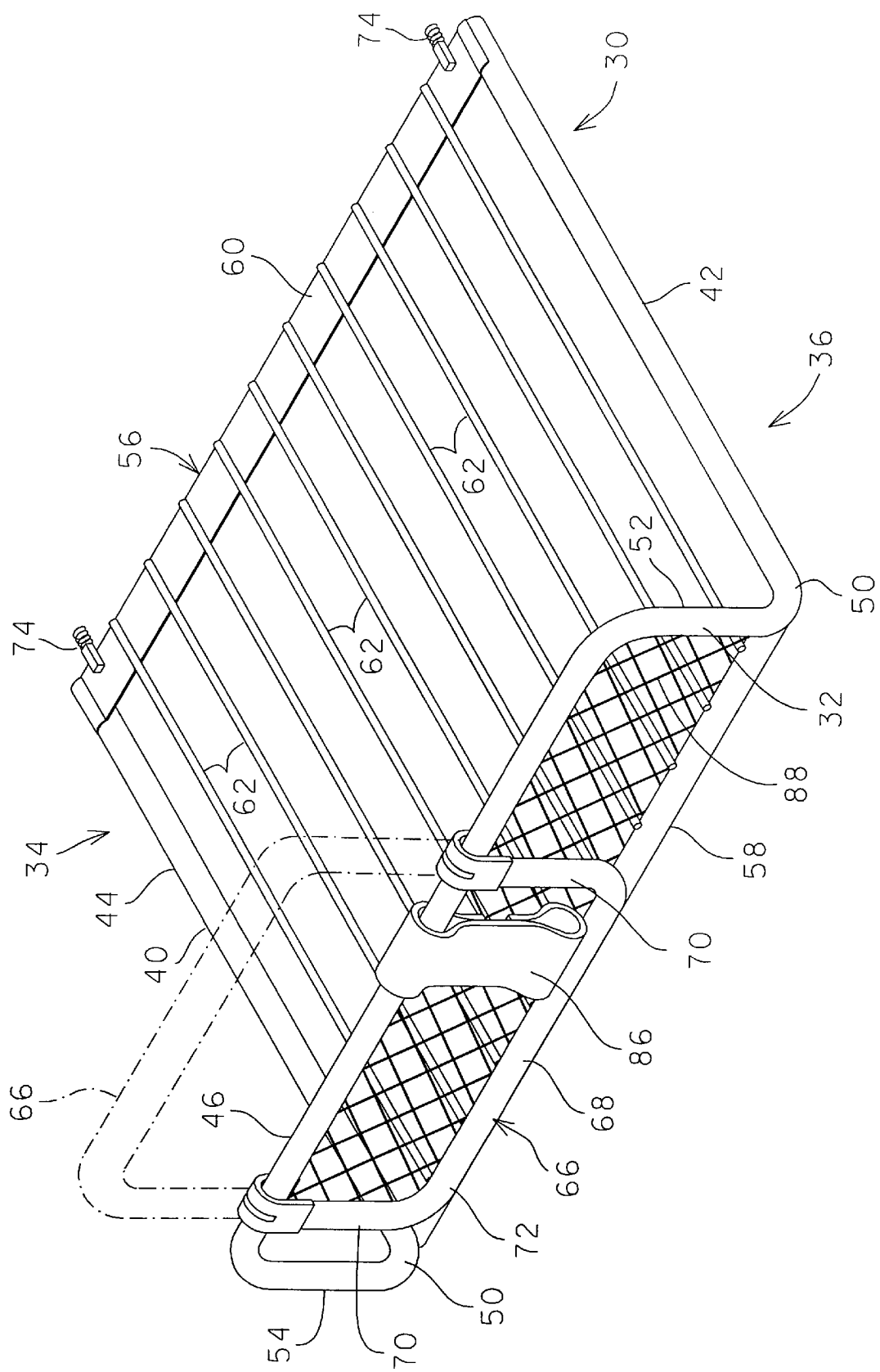
FIG. 2 is a perspective view of the cargo shelf of the present invention.

With reference again to FIG. 2, a netting 88 can be provided in the end wall 32 to enable the end wall to conform around the cargo placed on the shelf and more firmly hold it in place. Alternatively, a netting can be provided at the distal end of the shelf which is extended over cargo on the shelf and attached to the front edge of the seat bottom 12 via hook and loop fasteners, such as Velcro, or by buttons on the seat bottom which the netting is wrapped around, etc. The netting may be elastic to give it the ability to stretch over cargo.

Figure 5:
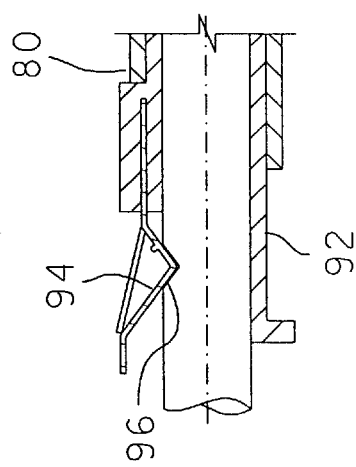
FIG. 5 is a sectional view similar to FIG. 4 showing an alternative embodiment using an adjustable position sleeve to mount the shelf to the seat.

With reference to FIG. 5, an alternative embodiment is shown. In this embodiment, a bushing or sleeve 92 is inserted into the tube 80 and receives the shelf leg 42. The bushing 92 is similar to a bushing used to hold the post of an adjustable head restraint at the upper end of a vehicle seat back. The bushing 92 is attached to the tube 80 in a conventional manner. The bushing carries a spring clip 94 which seats in one of a plurality of detents 96 in the leg 42. The bushing 92 and the spring clip are used to hold the cargo shelf in one or multiple use positions with varying degrees of extension of the shelf from beneath the foam cushion. Additionally, a detent can be provided at a stowed position to hold the cargo shelf in the stowed position. The bushing and spring clip, as well as the shelf legs, are of the type used to mount an adjustable headrest and are well known in the vehicle seating art.

The cargo shelf of the present invention is used to carry cargo within the passenger compartment of a vehicle that is not desirable to carry either on the seat itself or on the vehicle floor. The shelf is stored beneath the foam cushion of the seat bottom as close to the foam cushion as possible to minimize the interference with a vehicle seat occupant's leg room. As such, there is insufficient space to store cargo on the load platform when the shelf is in its stowed position. The shelf can only be used when it is extended from beneath the cushion of the seat bottom.

In the disclosed embodiment, the cargo shelf extends forward from the front edge of the vehicle seat. If desired, the vehicle seat can be configured with the shelf extending rearward to store things in the rear seat area of a vehicle, behind the front seat. The cargo shelf can be installed on a bench seat or a bucket seat, as shown.

It is to be understood that the invention is not limited to the exact construction illustrated and described above, but that various changes and modifications may be made without departing from the spirit and scope of the invention as defined in the following claims.

We claim:

1. A shelf mounted to a vehicle seat having a generally horizontal seat cushion, the shelf comprising:

a support shelf having a planar, generally horizontal load platform with proximal and distal ends and laterally spaced sides, the load platform being open along both the laterally spaced sides and at the proximal end while having a generally upright end wall at the distal end of the load platform;

at least one mount attached to the seat for mounting the support shelf to the seat; and the horizontal load platform having a slide member disposed in the at least one mount to mount the shelf to the seat for movement between a stowed position in which the load platform is substantially beneath the cushion with the end wall at the distal end of the load platform being adjacent an edge of the cushion and a use position in which the load platform is substantially extended from the cushion with the end wall at the distal end of the load platform being spaced from the seat cushion whereby objects may be supported upon the load platform above a vehicle body floor and retained between the end wall and the edge of the seat cushion.

2. The shelf of claim 1 further comprising a cargo netting attached to the shelf at the distal end thereof to retain cargo placed on the load platform.

3. The shelf of claim 1 wherein the end wall is formed by a pair of upright members at opposite sides of the load platform and a cross member extending between the upright members at upper ends of the upright member, the cross member forming an upper end of the end wall spaced above the load platform.

4. The shelf of claim 3 further comprising a netting spanning between the load platform and the cross member at the upper end of the end wall.

5. The shelf of claim 4 wherein the netting is elastic.

6. The shelf of claim 1 wherein the end wall has a lower portion fixed in position relative to the load platform and extending upwardly from the load platform to an upper end, and the end wall further having an upper portion movably attached to the lower portion and selectively movable between a position below the upper end of the lower portion and a raised position above the upper end of the lower portion to selectively increase the overall height of the end wall.

7. The shelf of claim 1 further comprising means operatively connected to the shelf and the seat for biasing the shelf toward the stowed position beneath the seat cushion whereby objects on the shelf are held between the end wall and the edge of the seat cushion.

8. The shelf of claim 1 wherein the vehicle seat has a a fixed rail fixed to a vehicle body and a slide rail movable relative to the fixed rail and wherein the shelf is attached to the slide rail of the seat.

9. The shelf of claim 1 further comprising a detent in the slide member and a catch in the at least one mount for seating in the detent to hold the shelf in the stowed position.

10. The shelf of claim 1 further comprising a detent in the slide member and a catch in at least one mount for seating in the detent to hold the shelf in the use position.

11. The shelf of claim 1 wherein the shelf includes a U-shaped rod having a pair of spaced parallel legs and a cross bar at one end of the legs, the legs being bent at substantially a right angle near the cross bar to form the end wall and the legs extending along the laterally spaced sides of the load platform and forming the slide member.

12. The shelf of claim 11 wherein the shelf further includes a metal grid attached to the spaced parallel legs to form the load platform.

* * * * *

UNITED STATES PATENT AND TRADEMARK OFFICE
CERTIFICATE OF CORRECTION

PATENT NO. : 5,967,602
DATED : 10/19/99
INVENTOR(S) : Kenneth R. Ptak and Belinda K. Wise It is certified that error appears in the above-indentified patent and that said Letters Patent is hereby corrected as shown below:

Item [56]

On the cover page, under "FOREIGN PATENT DOCUMENTS" the date on German reference no. 363197 "11/1992" should read as --11/1922--.

Signed and Sealed this

Fifth Day of September, 2000

Attest:

Q. TODD DICKINSON

*Attesting Officer*  *Director of Patents and Trademarks*